(12) United States Patent
Henretty et al.

(10) Patent No.: US 10,554,402 B2
(45) Date of Patent: *Feb. 4, 2020

(54) SYSTEM FOR RETRIEVAL OF EMAIL CERTIFICATES FROM REMOTE CERTIFICATE REPOSITORY

(71) Applicant: AirWatch, LLC, Atlanta, GA (US)

(72) Inventors: Christopher Henretty, Dunwoody, GA (US); William Pinner, Atlanta, GA (US); Emil Novakov, Atlanta, GA (US); Anand Patel, Suwanee, GA (US); David Shaw, Buford, GA (US); Marshall Brown, Woodstock, GA (US)

(73) Assignee: AirWatch, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/198,514

(22) Filed: Nov. 21, 2018

(65) Prior Publication Data

US 2019/0097799 A1 Mar. 28, 2019

Related U.S. Application Data

(63) Continuation of application No. 15/355,422, filed on Nov. 18, 2016, now Pat. No. 10,153,899.

(51) Int. Cl.
*H04L 9/08* (2006.01)
*H04L 9/32* (2006.01)
*H04L 29/06* (2006.01)

(52) U.S. Cl.
CPC .......... *H04L 9/0891* (2013.01); *H04L 9/3263* (2013.01); *H04L 63/0823* (2013.01)

(58) Field of Classification Search
None
See application file for complete search history.

(56) References Cited

U.S. PATENT DOCUMENTS

| 7,092,992 | B1 | 8/2006 | Yu | |
|---|---|---|---|---|
| 7,627,633 | B2 | 12/2009 | Rechterman | |
| 7,664,947 | B2 * | 2/2010 | Fang | H04L 63/0442 380/259 |
| 8,135,950 | B2 | 3/2012 | Parkinson | |
| 8,296,563 | B2 | 10/2012 | Tu | |
| 10,153,899 | B2 * | 12/2018 | Henretty | H04L 9/3263 |
| 2004/0064561 | A1 | 4/2004 | Parsons | |
| 2005/0069136 | A1 | 3/2005 | Thornton | |
| 2006/0015716 | A1 * | 1/2006 | Thornton | H04L 63/0823 713/155 |

(Continued)

*Primary Examiner* — Christopher A Revak
(74) *Attorney, Agent, or Firm* — Clayton, McKay & Bailey, PC

(57) ABSTRACT

An email request is received from a client device, where the email request is intended for an email server and includes a request for an email recipient's certificate. The compliance status of the client device is obtained. If the client device is in compliance, the email request is modified, and the modified email request is sent to the email server while a certificate retrieval request in the email request is redirected to a certificate repository implemented in a server separate from a certificate repository maintained by the email server. The email certificate is retrieved from the certificate repository and combined with information received from the email server to generate a response, which is sent to the client device.

20 Claims, 5 Drawing Sheets

(56) References Cited

U.S. PATENT DOCUMENTS

| | | |
|---|---|---|
| 2007/0168657 A1 | 7/2007 | Carro |
| 2007/0288746 A1* | 12/2007 | Jones ................. H04L 63/0428 |
| | | 713/156 |
| 2010/0153285 A1 | 6/2010 | Anderson |
| 2012/0005102 A1 | 1/2012 | McClung |
| 2014/0282829 A1 | 9/2014 | Dabbiere |

* cited by examiner

SYSTEM FOR RETRIEVAL OF EMAIL CERTIFICATES FROM REMOTE CERTIFICATE REPOSITORY

This application claims priority as a continuation of U.S. patent application Ser. No. 15/355,422, filed Nov. 18, 2016, and entitled "SYSTEM FOR RETRIEVAL OF EMAIL CERTIFICATES FROM REMOTE CERTIFICATE REPOSITORY," which is expressly incorporated by reference herein.

BACKGROUND

To reduce the cost of purchasing client devices and corresponding service charges, an enterprise may allow employees to utilize personal client devices under a "bring your own device" (BYOD) policy to access enterprise resources, such as electronic mail, contacts, calendar data, virtual private network (VPNs). Within the enterprise setting, client device administrators configure client devices to gain access to such resources, thereby allowing employees to remain highly productive regardless of whether the employees are on premises at the enterprise facility. Controlling email access is critical to ensure that email resources can only be accessed by authorized parties. Information technology (IT) administrators utilize access credentials to control which client devices can access email resources. Encryption protocols can be employed to ensure that the content in email messages remain secure. For example, Secure/Multipurpose Internet Mail Extensions (S/MIME) is a standard for encrypting the content of email messages, where a public key/private key methodology is employed. For configurations involving the use of S/MIME, email certificates are many times stored in an enterprise certificate server that incorporates a directory service such as MICROSOFT Active Directory.

BRIEF DESCRIPTION OF THE DRAWINGS

Various aspects of the present disclosure can be better understood with reference to the following drawings. The components in the drawings are not necessarily to scale. Emphasis is placed upon clearly illustrating various features of the present disclosure. Moreover, in the drawings, like reference numerals designate corresponding parts throughout the several views.

DETAILED DESCRIPTION

Large organizations may elect to store S/MIME public keys of users in a third party repository that is separate from a certificate repository (e.g., directory service such as Active Directory) maintained by an email server (e.g., Exchange server) due to the large volume of data and due to the lack of scalability. In such instances, however, conventional means for retrieving a recipient's S/MIME certificate from the email server will not be compatible with such configurations.

The present disclosure relates to utilizing a gateway service implemented in a proxy server for allowing client devices to access email certificates (e.g., S/MIME certificates) from a certificate repository. Specifically, the present invention achieves a technical effect of allowing organizations to store email certificates in a repository that is separate from a certificate repository maintained by an email server (e.g., Exchange server).

Figure 1:
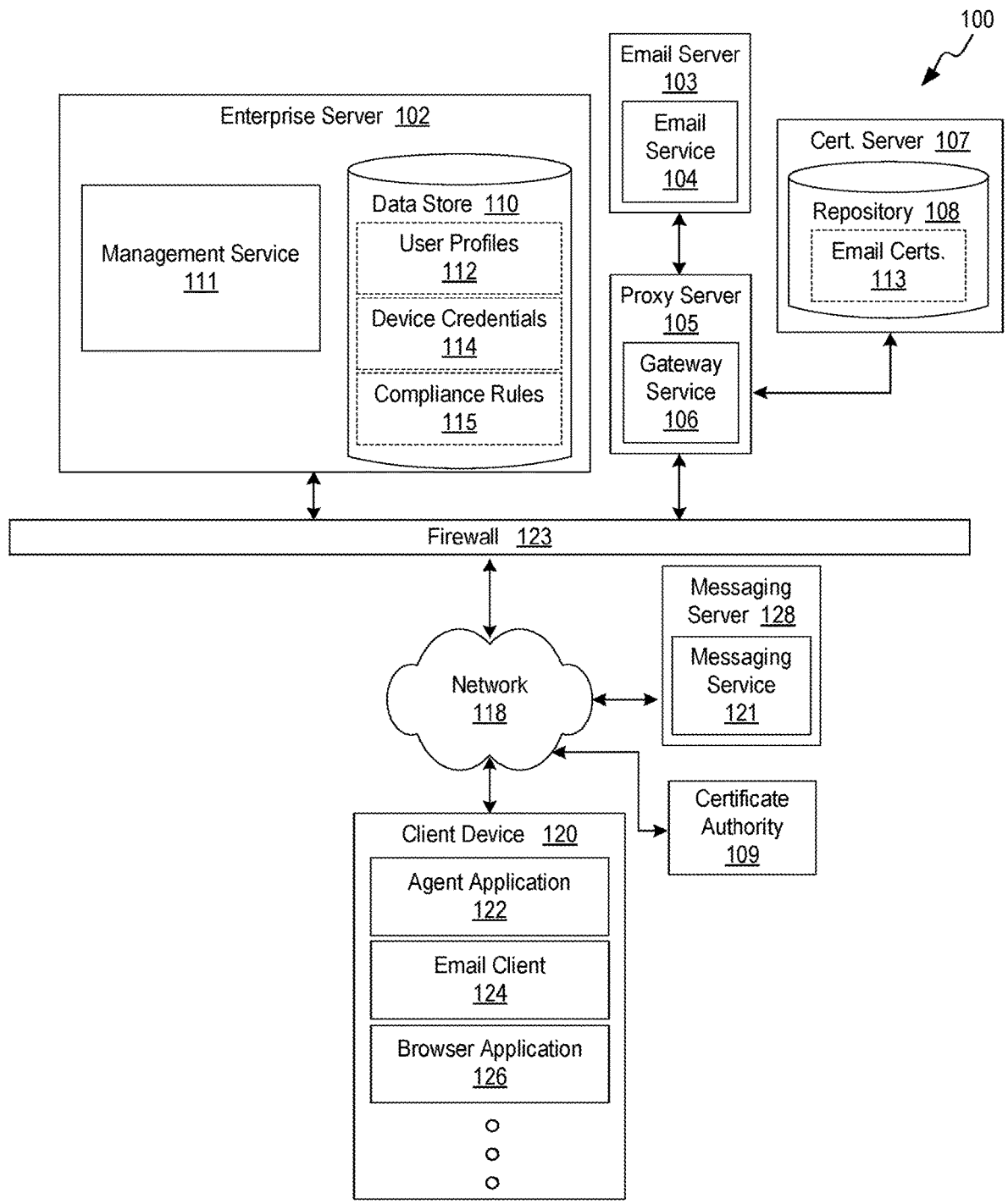
FIG. 1 is a block diagram of a networked environment for retrieving email certificates from a repository that is separate from a certificate repository maintained by an email server in accordance with various embodiments.

A description of a system for retrieving email certificates from a repository that is separate from a certificate repository maintained by an email server is now described followed by a discussion of the operation of the components within the system. FIG. 1 depicts a networked environment 100 that includes an enterprise server 102, a client device 120, an email server 103, a proxy server 105, a certificate server 107, a messaging server 128, and a certificate authority 109, which can be communicatively coupled to one another over a network 118. The network 118 can include, for example, the Internet, one or more intranets, extranets, wide area networks (WANs), local area networks (LANs), wired networks, wireless networks, other suitable networks, or any combination of two or more such networks. For example, the networks can include satellite networks, cable networks, Ethernet networks, and other types of networks.

The enterprise server 102 can comprise, for example, a server computer or any other system providing computing capability. Alternatively, the enterprise server 102 can employ a plurality of computing devices that can be arranged, for example, in one or more server banks, computer banks or other arrangements. Such computing devices can be located in a single installation or can be distributed among different geographical locations. For example, the enterprise server 102 can include a plurality of computing devices that can collectively comprise a hosted computing resource, a grid computing resource and/or any other distributed computing arrangement. In some cases, the enterprise server 102 can correspond to an elastic computing resource where the allotted capacity of processing, network, storage, or other computing-related resources can vary over time. The enterprise server 102 can also include or correspond to one or more virtualized server instances that are created in order to execute the functionality that is described herein.

A management service 111 can be executed in the enterprise server 102 to monitor and manage the operation of client devices 120 in accordance with enterprise resource policies. In some instances, the management service 111 can manage and monitor the operation of client devices 120 enrolled with the management service 111. The management service 111 can also provide client devices 120 with access to email, calendar data, contact information, and other enterprise resources. The management service 111 can include an enrollment service that communicates with a client device 120 during the initial stages of enrollment with the management service 111.

The management service 111 can provide the client device 120 with a uniform resource locator CURL), IP address, or other information that can be used by the client device 120 to communicate with a specific instance of an enrollment service to initiate enrollment with a specific instance of a management service 111. That is, the networked environment 100 and/or enterprise server 102 can include a plurality of instances of an enrollment service and a plurality of instances of a management service 111 accessible through the networked environment, which can be accessed by the client device 120 through addresses specified by a particular URL, IP address, etc. The enrollment service can also provide the client device 120 with a token that indicates that the client device 120 has been authenticated and that the client device 120 is permitted to communicate with the management service 111. In some instances, the end user of the client device 120 can install an agent application 122 that causes the client device 120 to enroll with the management service 111, causes the client device 120 to be remotely configured and/or provisioned resources by the management service 111, causes the client device 120 to enforce security policies and compliance, causes the client device 120 to be provided with secure remote access to enterprise resources, and so on.

The management service 111 can be further configured to maintain a command queue of commands that are designated for execution by the client device 120, where each client device 120 has a corresponding command queue. A client device 120 can be provisioned by the enterprise server 102 by causing resources to be installed or stored on the client device 120 through the use of the command queue. To implement such a process, the enterprise server 102 places a command related to provisioning in the command queue. Regardless of whether a provisioning command or other command is stored in the command queue, the client device 120 can retrieve commands stored in its assigned command queue.

The enterprise server 102 can include a data store 110, where the data store 110 can be representative of a plurality of data stores. The data stored in the data store 110, for example, can be associated with the operation of the various applications and/or functional entities described below that are executed in the enterprise server 102. Various components can execute on a processor of the enterprise server 102 which can configure the processor to perform various operations.

Data stored in the data store 110 can include data describing the state of the client device 120 that specifies, for instance, various settings that are applied to the client device 120, applications that are installed on or that are being executed by the client device 120, the operating system and version installed on the client device 120, and resources (e.g., files, services) that are accessible to the client device 120.

Settings applied to the client device 120 can comprise values (e.g., IP address of an enterprise server 102) that enable functionality (e.g., turn on disk encryption) or disable functionality (e.g., require TLS/disable HTTP traffic). In this regard, such settings can comprise configurations or restrictions that control a plurality of operations that can be performed by the client device 120. Additionally, the data describing the state of the client device 120 can specify information related to the management of the client device 120 such as the last time the client device 120 provided its state information to the management service 111, whether the client device 120 is in a state of compliance with any applicable compliance rules 115, whether any actions have been or are to be taken as a result of a noncompliance with any applicable compliance rules 115, and so on.

Other data in the data store 110 of the enterprise server 102 can include user profile data 112, device credential data 114, compliance rules 115, and other data. The user profile data 112 can include data associated with a user account, such as mailbox data, calendar data, contact data, and so on. User profile data 112 can also include other account settings, such as biographical or demographic information about a user, password reset information, multi-factor authentication settings, and other data.

Device credential data 114 can include resource access settings for each specific client device 120. The device credential data 114 can include, for example, authentication credentials, delegation settings (e.g., information about other users who may be provided access to the user profile data 112 of a particular user), mail and document retention rules and/or policies, and/or other geographic access restrictions or limitations (e.g., information about certain locations and/or networks from which enterprise resources can be accessed).

Compliance rules 115 can include enterprise resource usage policies, which can be defined by an IT administrator. Client devices 120 seeking to access enterprise resources can, for instance, be required to comply with such compliance rules 115 in order to gain access to enterprise resources. That is, the operations, uses and/or configurations of the client device 120 must adhere to specifications and/or restrictions specified by the compliance rules 115. If the client device 120 violates one or more specifications of the compliance rules 115, escalating remedial actions can be performed to cause the client device 120 to be placed into compliance with the compliance rules 115. In one example, remedial actions can be initiated automatically when it is determined that the client device 120 is in violation of the compliance rules 115. In another example, remedial actions can be initiated at the request of an IT administrator. As the nature of the non-compliant activity increases in severity, the corresponding remedial action can escalate accordingly. Further, data describing management policies can include permissions or access rights of the client device 120 and settings that are being enforced upon the client device 120 for purposes of controlling if, when, and how the client device 120 is permitted to function.

For each client device 120, a device record is established and maintained by the management service 111, where the compliance rules 115 and management policies associated with an organizational group are reflected in the device record for each member client device 120. The device record can specify organizational groups (e.g., sales and marketing, legal) of which the client device 120 is a member. In some implementations, an administrator of the management service 111 can specify a static hard coded relationship between a client device 120 and an organizational group. That is, the client device 120 can be specified as a member of a particular organizational group regardless of any context. Alternatively, the administrator of the management service 111 can specify a dynamic relationship that causes a membership condition associated with an organizational group to be evaluated and, based on such evaluation, associates the client device 120 with a particular organizational group. That is, membership conditions can be monitored to determine whether they are satisfied on an ongoing basis. Upon determining that a membership condition is not satisfied, the client device 120 can be excluded from the organizational group.

The management service 111 can associate the client device 120 with an organizational group by storing data in a device record for the client device 120 indicating that the client device 120 is a member of a particular organizational group. In some instances, associating the client device 120 with an organizational group can involve generating or modifying a data structure that represents associations between particular client devices 120 and a particular organizational group. For instance, the enterprise server 102 can generate a data structure representing an organizational group, can associate an identifier with the group and can associate members with the identifier (or data objects representing the members).

The client device 120 can be embodied as a processor-based system such as a desktop computer, a laptop computer, a smartphone, a tablet computer system, and so on. The client device 120 includes a display that comprises, for example, one or more devices such as liquid crystal display (LCD) displays or other types of display devices. The client device 120 is equipped with networking capability or networking interfaces, including a localized networking or communication capability, thereby allowing the client device 120 to be communicatively coupled to the enterprise server 102 over the network 118.

The client device 120 can execute various applications, such as an agent application 122, an email client 124, a browser application 126, and other applications, services, or processes. The agent application 122 is in communication with various components on the enterprise server 102, including the proxy server 105 and mail server. As discussed above, client device 120 can be provisioned by the management service 111 by causing resources to be installed or stored on the client device 120 through the use of the command queue maintained by the management service 111. The management service 111 can therefore permit or deny various services to the client device 120.

The email client 124 can be executed to gain access to such data as mailbox data, calendar data, contact data, and so on. Where compliance rules 115 are stored locally on the client device 120, the agent application 122 monitors activities associated with the email client 124, the browser application 126, and other applications installed on the client device 120 to determine whether activities associated with the client device 120 comply with the compliance rules 1 15. Each client device 120 can include a data store configured to only allow authorized users access to data stored within the data store. The data store can also include user credentials associated with the end user of the client device 120.

Once a client device 120 has been remotely provisioned and enrolled by the IT administrator, the activities of the client device 120 can be tracked by the management service 111. Compliance rules 115 can also be stored on the client device 120, where an agent application 122 reports any violations of compliance rules 115 to the enterprise server 102. In this regard, compliance rules 115 can be stored in the data store 110 and/or on the client device 120 and represent requirements with which a user and/or a client device 120 must comply in order to access enterprise resources.

In one instance, a client device 120 can become a member of or become associated with an organizational group when an administrator of the organizational group specifies that the client device 120 should be a member through a static hard coding. In another instance, a client device 120 can become a member of an organizational group when a membership condition is satisfied through a dynamic evaluation of the membership condition. A membership condition can be created by an administrator of the organizational group by specifying a condition related to the client device 120 that when satisfied, causes the membership of the organizational group to include the client device 120. Conversely, the membership condition can also specify a condition related to the client device 120 that, when not satisfied, causes the membership of the organizational group to exclude the client device 120.

Once a particular individual has been identified as a member of the organizational group, one or more client devices 120 that the particular individual has or is using can become members of the organizational group. In this way, by virtue of a particular individual being a member of an organizational group, all the client devices 120 operated by the particular individual become subject to the management policies and compliance rules 115 associated with the organizational group—thereby controlling if, when, and how such client devices 120 can be operated by the particular individual.

The messaging server 128 is communicatively coupled to the enterprise server 102 and client devices 120 over the network 118. The messaging server 128 can include a messaging service 121 (e.g., APPLE PUSH NOTIFICATION SERVICE). Through the use of such messaging services 121, the enterprise server 102 can send notification data to a fleet or grouping of client devices 120. The enterprise server 102 operates in conjunction with a messaging service 121 executing on the messaging server 128 to facilitate communication between the enterprise server 102 and client devices 120. A client device 120 can establish an outbound connection to the messaging service 121 on a transmission control protocol (TCP) port (e.g., 5223, 443). The client device 120 can maintain a lightweight persistent connection to the messaging service 121 at all times, where the connection with the messaging service 121 can be reestablished whenever a client device 120 experiences a network state change (e.g., transition from one LAN to another).

To reestablish a connection with the messaging service 121, the client device 120 can be configured to send a "client hello" message or a request to establish a connection with the messaging service 121 on a variable frequency according to a proprietary algorithm implemented by a vendor of the messaging service 121. For example, a connection with the messaging service 121 can be reestablished upon a reboot of the client device 120 or upon regaining network access after a period of no network access. In response, the messaging service 121 can establish the lightweight persistent connection with the client device 120. The messaging service 121 can then send any messages that have not yet been sent to the client device 120. The management service 111 can establish a communication channel with the messaging service 121 executing on the messaging server 128, and can instruct the messaging service 121 to transmit a particular message to a client device 120. Specifically, the management service 111 can establish an outbound connection to the messaging service 121 on a TCP port (e.g., 2195). The messaging service 121 can communicate with the management service 111 over another TCP port (e.g., 2196).

The messaging service 121 can notify the client device 120 to communicate with the management service 111, where the client device 120 communicates directly with the management service 111 over a TCP port (e.g., 443). Once a direct connection is established between the client device 120 and the enterprise server 102, the management service 111 can instruct the client device 120 to retrieve updates, applications, commands, etc. from the command queue associated with the client device 120.

The email server 103 is communicatively coupled to the enterprise server 102 and client devices 120 over the network 118. The management service 111 can provide information to an email service 104 executing on the email server 103. In some examples, the management service 111 can first confirm that a particular client device 120 is enrolled with the system. This can be accomplished by accessing a data object associated with an enrollment component or an administrator component of the management service 111. The management service 111 can also confirm that the client device 120 is complying with all applicable compliance rules 115 relevant to the client device 120. In some examples, the management service 111 can request a new or updated data object reflecting the current state of the client device 120 to ensure that enrollment and compliance are up to date. As discussed in more detail below, if the management service 111 determines that a client device 120 does not comply with applicable compliance rules 115, the client device 120 can be denied from accessing such enterprise resources as email. Although the email server 103 is shown as part of networked environment 100 located behind the corporate firewall 123, the email server 103 can be a third-party server, or group of servers.

The email service 104 executing on the email server 103 can employ S/MIME to encrypt and secure the content of email messages sent between client devices 120. The email service 104 can send encrypted email messages that comply with S/MIME or any other encrypted email standard or protocol to a recipient mail server directly or through a relay mail server. On the recipient side, the email client 124 executing on the client device 120 decrypts the encrypted email message using a private key that corresponds to the recipient's public key.

With regards to receiving email, the email service 104 can be configured to operate according to a protocol (e.g., MICROSOFT ActiveSync) that enables client devices 120 to synchronize with the email server 103 on a recurring basis. In some instances, client devices 120 can maintain a lightweight persistent connection with the email service 104. For example, client devices 120 can open a channel which is authenticated with the email server 103. The email server 103 can then respond to periodic ping requests from the client devices 120 for purposes of notifying client devices 120 if any changes have occurred that require client devices 120 to take action. Specifically, when a client device 120 receives a status code response that indicates a change in the email server 103, the client device 120 can transmit a reply (e.g., a Sync command with a Sync Key value) to reflect its current state. In implementations where the client device 120 transmits a Sync command with a Sync Key value, the Sync Key can be a variable number that corresponds to a database state on the email server 103.

At that time, the email server 103 can respond with information reflecting a change from its current state relative to when the Sync Key was generated, and the client device can receive the corresponding messages. As an alternative to maintaining a lightweight persistent connection with the email service 104, the email service 104 can communicate with the messaging service 121 executing in the messaging server 128 to notify a client device 120 that an email message is available. This alternative does not require the email client 124 executing on the client device 120 to run in the background as an active process.

The proxy server 105 is coupled to the email server 103 and can filter all communication requests sent from client devices 120 to the email server 103. In some instances, the proxy server 105 can be installed in-line with the email server 103 behind the firewall 123, where a gateway service 106 executing on the proxy server 105 can function as a gateway for all email traffic originating from client devices 120 going to and from the email server 103. The management service 111 can notify the gateway service 106 when a client device 120 is enrolled. When the enrolled client device 120 later connects to the proxy server 105, the gateway service 106 can recognize the client device 120 as a managed device. The gateway service 106 can then forward data to the email server 103 from approved client devices 120 (e.g., managed devices). In this regard, the gateway service 106 can protect the email server 103 by acting as a proxy for the email server 103, thereby not allowing any client devices 120 to directly communicate with the email server 103. As a security measure, the IT administrator can configure the gateway service 106 to control how email attachments and other content, hyperlinks, etc. are viewed on client devices 120. Other security controls can include the blocking of unmanaged client devices 120 from accessing email resources, enforcement of encryption, and so on.

The certificate server 107 can represent one or more computing devices, computing environments or other servers. Email certificates 113 associated with one or more user accounts can be stored in a repository 108 maintained by the certificate server 107. The repository 108 can be representative of a plurality of data stores or other storage devices or services as can be appreciated. The certificate server 107 can be implemented in the same domain as the email server 103 behind the corporate firewall 123. However, the certificate 107 can also be located outside of the firewall 123. In some instances, the certificate server 107 can be implemented according to the Lightweight Directory Access Protocol (LDAP) protocol for accessing distributed directory information over the network 118. In such instances, an email certificate 113 (e.g., S/MIME certificate) can be retrieved by the gateway service 106, whereby a request to retrieve an email certificate 113 associated with a recipient client device 120 is redirected to the certificate server 107 rather than being forwarded to the email server 103.

The certificate authority 109 can represent a service that is a key authority or a certificate authority that issues digital certificates. The certificate authority 109 can bind public keys with respective user identifies, where the binding can be established through the registration and issuance process. A digital certificate can certify ownership of a public key by the user identity associated with the certificate. The certificate authority 109 can perform such functions as receiving to requests to validate a certificate, receiving requests (or information that is evaluated) for revoking a certificate, issuing new certificates, and so on. The certificate authority 109 or management service 111 can cause certificates to be stored in the certificate server 107. The management service 111 can use application programming interfaces (APIs) to cause issuance or revocation of certifications. It should be noted that S/MIME certificates can be individually created by users using tools (e.g., OpenSSL) or through requests to a service (e.g., Comodo). In those cases, the "self-created" certificate is still a legitimate S/MIME certificate and would work in the system of FIG. 1.

Figure 2:
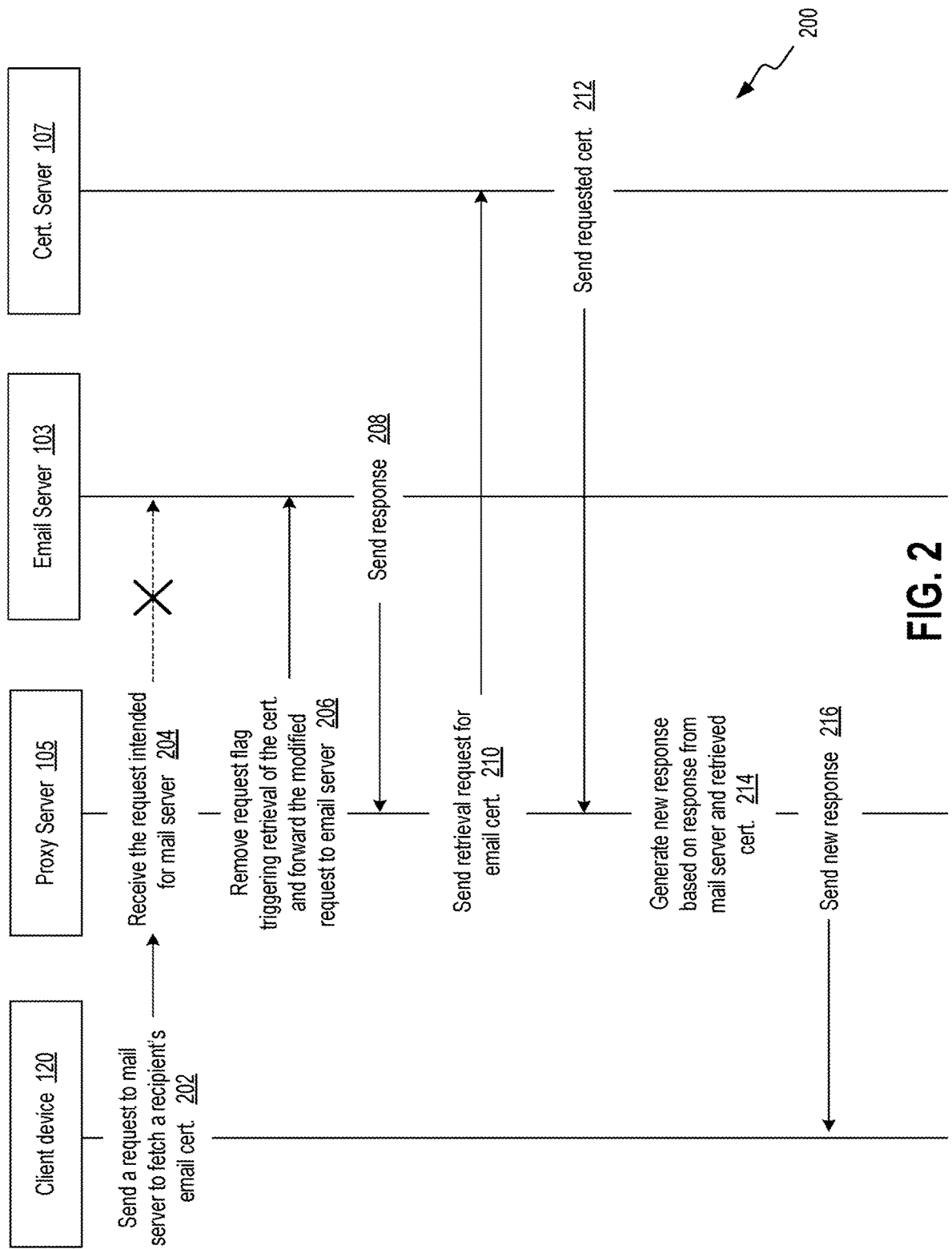
FIG. 2 is a sequence diagram that illustrates the interaction between various components in the networked environment of FIG. 1 for retrieving email certificates from a repository that is separate from a certificate repository maintained by an email server in accordance with various embodiments.

Reference is made to FIG. 2, which is a sequence diagram 200 that further illustrates the interaction between various components in the networked environment of FIG. 1 for retrieving email certificates 113 from a repository 108 separate from a certificate repository maintained by an email server 103.

To begin, at step 202, a sender client device 120 can initiate an email request (e.g., ActiveSync Resolve Recipients request) for purposes of sending an email message to one or more recipient client devices 120 specified by one or more email addresses. Such a request can be generated by an email client 129 and/or a user interface rendered by a browser application 126 when the user wishes to send an email message. Using MICROSOFT'S ActiveSync protocol, client devices 120 can use a command (e.g., SendMail command) when connected to an endpoint that handles ActiveSync traffic. Thus, if a sender client device 120 wishes to send an email message, the sender client device 120 can post an Exchange ActiveSync command to the endpoint with the command as part of the command string and post the email message to the email server 103 in the content of the request. The email request (e.g., ActiveSync Resolve Recipients request) is utilized when the user of a client device 120 specifies a recipient (e.g., populates the recipient field in a new email) and wishes to create a new encrypted email message and the client device 120 does not have the recipient's public key. For example, the email client 124 executing on the client device 120 may determine that the recipient's email certificate stored locally on the client device 120 has expired or that a copy of the recipient's email certificate is not stored locally.

At step 204, the gateway service 106 receives the email request intended for the email server 103. The email request can include a certificate retrieval request intended for the email server 103. In some implementations, the gateway service 106 can process the certificate retrieval request and determine whether to fetch the certificate from a certificate repository maintained by the email server 103 or from another location (e.g., the certificate server 107). This determination can be based on instructions originated by the management server 111. For instances where the gateway service 106 fetches the certificate from a repository that is separate from a certificate repository maintained by the email server 103, the gateway service 106 can modify the email request before forwarding the modified request to the email server 103, where the modified email request may request information other than an email certificate.

At step 206, the gateway service 106 executing in the proxy server 105 can modify the request generated by the sender client device 120 and forwards the modified request to the email server 103. The modified request can include a request for information relating to the one or more recipients of the email message. Such information can include, for example, a photo of the recipient, the recipient's current calendar availability status (e.g., busy status), the recipient's phone number, calendar data, and/or other information associated with the recipient. Normally, the email service 104 can also identify or obtain, based upon the identity of the recipient, an email certificate 113 from a certificate server 107 maintained by the email server 103 that corresponds to the recipient's organization. However, as described below, the proxy server 105 instead retrieves the email certificate 113 from the repository 108 maintained by the certificate server 107. In some instances, the gateway service 106 can modify the email request by changing the value of a flag or attribute in the email request, where the flag or attribute triggers retrieval of an email certificate 113 (e.g., S/MIME certificate).

At step 208, the email service 104 executing in the email server 103 can authorize the request generated by the sender client device 120 and can return any relevant information that was requested. The relevant information can include, for example, a photo of the recipient, the recipient's current calendar availability status (e.g., busy status), the recipient's phone number, calendar data, and/or other information associated with the recipient. The relevant information can be sent as a response back to the gateway service 106 executing in the proxy server 105.

At step 210, rather than forwarding the email certificate request to the email sever 103, the gateway service 106 can instead send a retrieval request to the certificate server 107 to retrieve the email certificate 113 (e.g., S/MIME certificate). As discussed above, the certificate server 107 maintains a repository 108 where the certificate server 107 is a separate entity from the email server 103. In instances where the certificate server 107 is implemented according to the LDAP protocol, the gateway service 106 executing in the proxy server 105 queries the certificate server 107, which may be configured as an OpenLDAP server. In such instances, the gateway service 106 can send a retrieval request that opens a Uniform Resource Locator (URL) associated with the certificate server 107 (e.g., OpenLDAP server). Specifically, the URL can specify a location of the certificate server 107. The retrieval request sent by the gateway service 106 can also include such information as an account user name and associated password for accessing the certificate server 107.

At step 212, the certificate server 107 retrieves the email certificate 113 stored in the repository 108 based on the retrieval request sent by the gateway service 106. The certificate server 107 can retrieve the email certificate 113 (e.g., S/MIME certificate) in response to an LDAP query. Upon retrieving the requested email certificate 113, the certificate server 107 can forward the email certificate 113 to the gateway service 106.

At step 214, once the gateway service 106 has received responses from both the email server 103 and the certificate server 107, the gateway service 106 can combine the received responses to generate a new response. The gateway service 106 can then send the generated response back to the requesting client device 120. The response received from the email server 103 can include relevant user-related information to be included with the retrieved certificate. The response received from the email server 103 can also include a response that validates that the client device 120 that sent the email request has authorization to make the email request.

In some instances, it is possible for the email service 104 executing in the email server 103 to reject the email request sent by the client device 120, and the response sent by the email service 104 to the gateway service 106 can specify a failure status code. In instances where the email service 104 determines that the client device 120 is not authorized to send the email request, the gateway service 106 does not query the certificate server 107 for the email certificate 113.

At step 216, the gateway service 106 sends the generated response to the client device 120 that sent the email request. In instances where the email service 104 determines that the client device 120 is not authorized to send the email request, the gateway service 106 can send a failure status code to the client device 120 without sending the requested email certificate 113. In instances where the client device 120 is authorized to send the email request, the generated response can include the requested email certificate 113, user-related information, and so on. The client device 120 can use the email certificate 113 to generate an encrypted payload by encrypting the email message and then incorporate this encrypted payload into a mail transport message. Such a mail transport message can be generated according to the S/MIME standard and transmitted to the gateway service 106 to be relayed to the email service 104. The email service 104 can then relay the mail transport message to the recipient client device 120.

Figure 3:
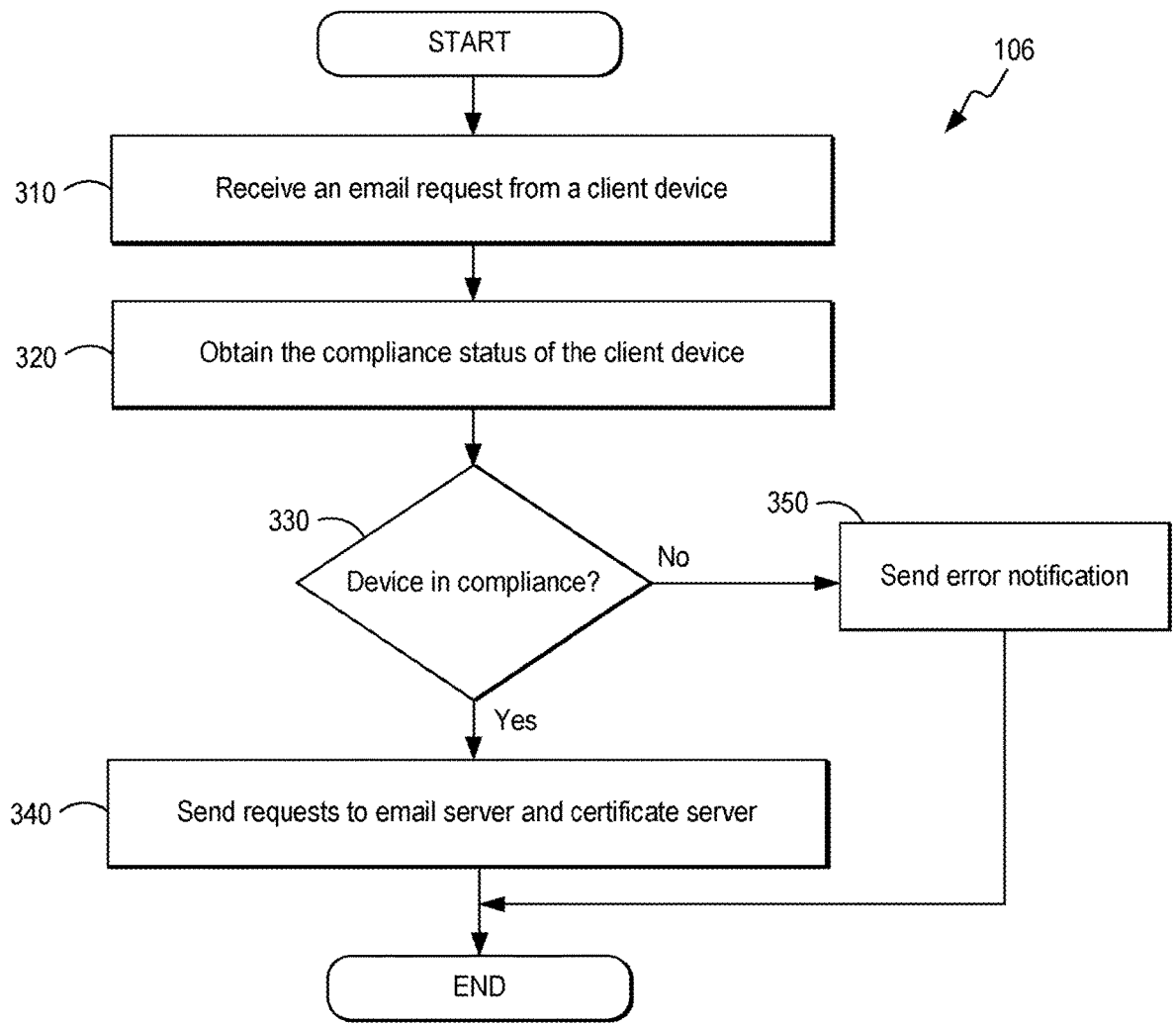
FIG. 3 is a flowchart that illustrates how the gateway service executing in the proxy server facilitates retrieval of email certificates from a repository that is separate from a certificate repository maintained by an email server in accordance with various embodiments.
Figure 4:
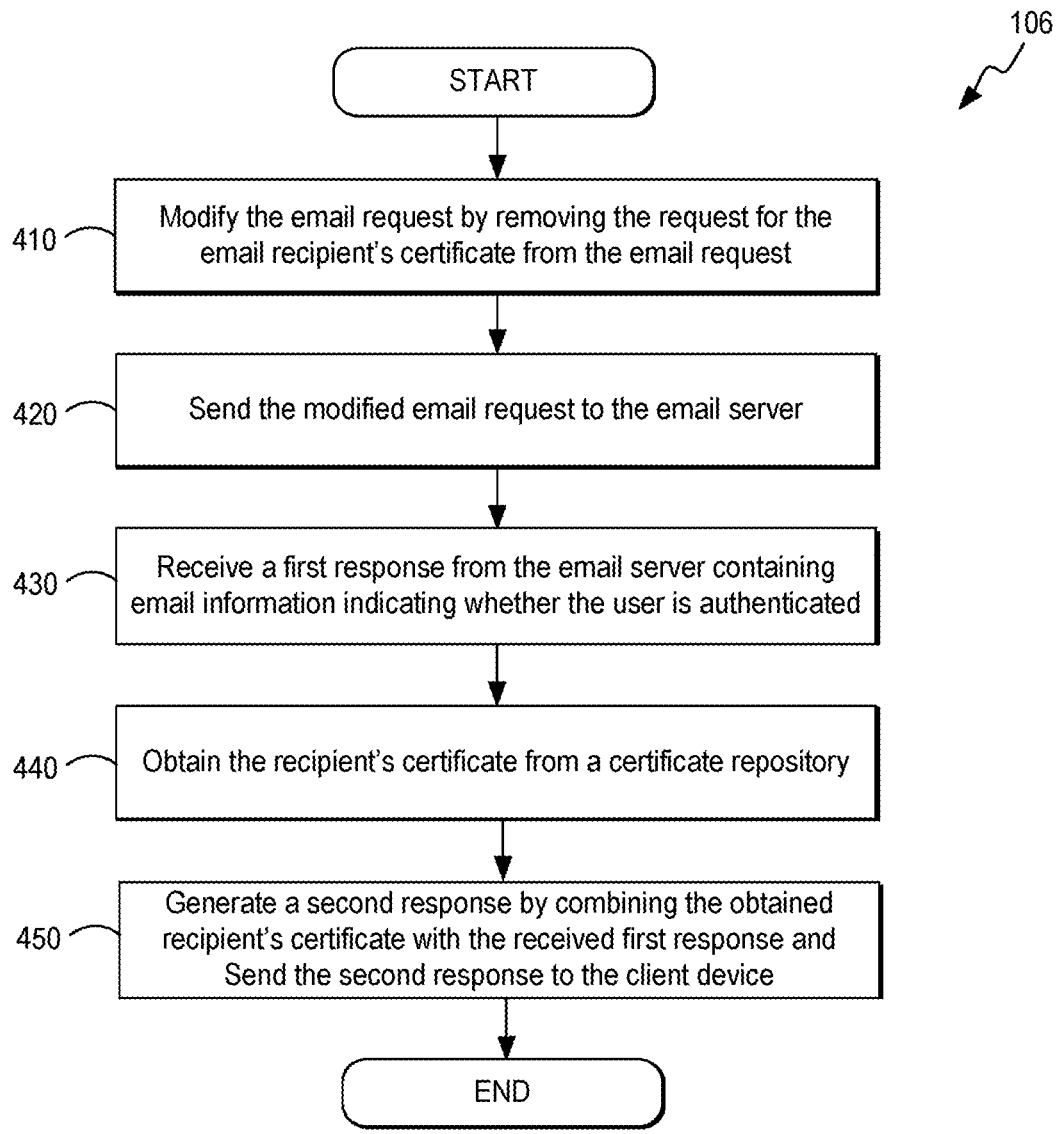
FIG. 4 illustrates how the gateway service processes an email request sent by a client device when the client device is in compliance in accordance with various embodiments.
Figure 5:
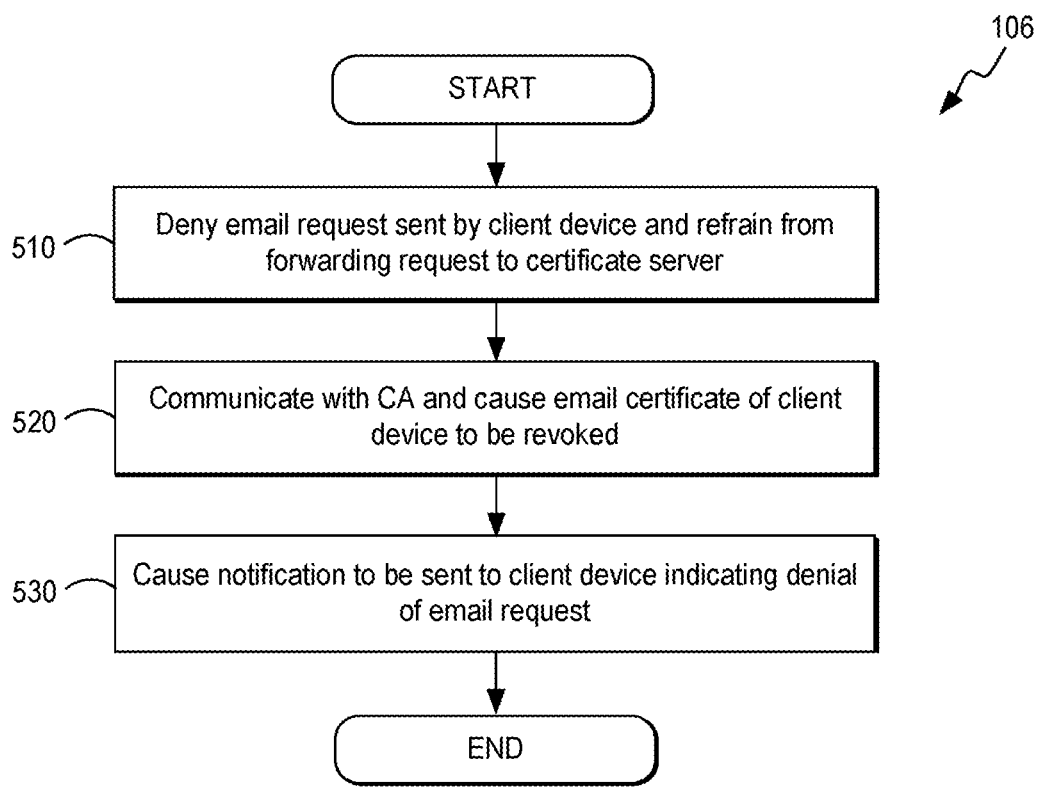
FIG. 5 illustrates how the gateway service processes an email request sent by a client device when the client device is not in compliance in accordance with various embodiments.

The flowcharts in FIGS. 3 to 5 further illustrate how the gateway service 106 executing in the proxy server 105 facilitates retrieval of email certificates 113 (e.g., S/MIME certificates) from a repository 108 separate from a certificate repository maintained by an email server 103. Reference is made to FIG. 3, which is a flowchart that illustrates how the gateway service 106 processes an email request sent by a client device 120 based on the compliance status of the client device 120.

Beginning at step 310, the gateway service 106 executing on the proxy server 105 can receive an email request from a client device 120, where the email request is intended for the email server 103. The email request (e.g., ActiveSync Resolve Recipients request) sent by the client device 120 can be used for purposes of sending an email message to one or more recipient client devices 120 specified by one or more email addresses. Thus, if a client device 120 wishes to send an email message, the client device 120 can post an Exchange ActiveSync command to the endpoint with the command as part of the command string and post the email message to the email server 103 in the content of the request.

At step 320, the gateway service 106 can obtain the compliance status of the client device 120 that sent the email request. As discussed earlier, compliance rules 115 can include enterprise resource usage policies, which can be defined by an IT administrator. Client devices 120 seeking to access email resources can, for instance, be required to comply with such compliance rules 115 in order to gain access to email and other enterprise resources. In some instances, when the gateway service 106 receives an email request from a client device 120 for purposes of sending an email message, the gateway service 106 can communicate with the management service 111 to query a compliance status of the client device 120. In response, the management service 111 can establish a communication channel with the messaging service 121 executing on the messaging server 128 and can instruct the messaging service 121 to transmit a message to a client device 120. The message transmitted to the client device 120 by the messaging service 121 can instruct the client device 120 to check in with the management service 111 and provide status information associated with the client device 120. The status information provided by the client device 120 to the management service 111 can then be communicated to the gateway service 106.

At decision block 330, if the status information provided to the gateway service 106 indicates that the client device 120 is in compliance with compliance rules 115, then in step 340, the gateway service 106 proceeds with processing the email request sent by the client device 120. Additional details regarding step 340 are described below in connection with the flowchart shown in FIG. 4.

Returning to decision block 330, if the status information provided to the gateway service 106 indicates that the client device is not in compliance with compliance rules 115, then in step 350, the gateway service 106 can send an error notification to the client device 120 and can deny the email request sent by the client device 120. Additional details regarding step 350 are described below in connection with the flowchart shown in FIG. 5. Thereafter, the process shown in FIG. 3 ends.

Reference is made to FIG. 4, which is a flowchart that provides additional details relating to step 340 in FIG. 3 where the gateway service 106 processes the email request sent by a client device 120 when the client device 120 is in compliance.

Beginning at step 410, the gateway service 106 modifies the email request sent by the client device 120 by removing the request for the email recipient's certificate from the email. In some instances, the email request sent by the client device 120 can be embodied as a MICROSOFT ActiveSync Resolve Recipients request. In such instances, the gateway service 106 can modify a flag or attribute in the request that triggers retrieval of an email certificate 113 (e.g., S/MIME certificate). Specifically, in such instances where an ActiveSync Resolve Recipients request is sent, the gateway service 106 can modify a CertificateRetrieval flag or attribute present in the ActiveSync Resolve Recipients request such that an email certificate 113 is no longer requested from the email service 104. Instead, the certificate retrieval request is redirected to the certificate server 107 by the gateway service 106, which is separate from the email server 103.

At step 420, the gateway service 106 sends the modified email request to the email service 104 executing on the email server 103. The modified request sent to the email server 103 can include a request for data other than the email certificate 113. For example, the modified request can request information about the recipient of the email message. Such information can later be included with the email certificate 113 retrieved from the certificate server 107. In some instances, the email service 104 receives the modified email request and in response, validates whether the client device 120 that originated the email request has authorization to make the request.

At step 430, the gateway service 106 receives a response from the email service 104 indicating whether the user is authenticated. For example, if the client device 120 is not authorized to make the request, the email service 104 can communicate this information in the response sent to the gateway service 106. In such instances, the gateway service 106 will not redirect the certificate retrieval request to the certificate server 107. A failure status code can then be sent to the client device 120. Other relevant information in the response from the email service 104 can include, for example, a photo of the recipient, the recipient's current calendar availability status (e.g., busy status), the recipient's phone number, calendar data, and/or other information associated with the recipient. Such relevant information can be sent as a response back to the gateway service 106.

At step 440, the gateway service 106 can communicate with the certificate server 107, and the certificate server 107 can retrieve the email certificate 113 stored in the repository 108 based on the retrieval request. In some instances, the gateway service 106 can first evaluate the response sent by the email service 104 before determining whether to request an email certificate 113 from the certificate server 107. If the client device 120 is not authorized to make the email request, the gateway service 106 will not redirect the certificate request to the certificate server 107. The gateway service 106 can redirect the certificate request to the certificate server 107 in response to the email service 104 validating that the client device 120 is authorized to make the email request. In this regard, it is possible for the client device 120 to be in compliance but where the user of the client device 120 is not an authorized user. This may occur, for example, if the user's login credentials have expired while the user is logged in. In some instances, the certificate server 107 can retrieve the email certificate 113 (e.g., S/MIME certificate) in response to an LDAP query.

At step 450, the gateway service 106 can combine the response received from the email service 104 with the email certificate 113 retrieved from the certificate server 107 to generate a new response and can send the generated response to the client device 120. The generated response can also include information that validates that the client device 120 that sent the email request has authorization to make the email request. Thereafter, the process shown in FIG. 4 ends.

Reference is made to FIG. 5, which is a flowchart that provides additional details relating to step 350 in FIG. 3 where the gateway service 104 denies the email request sent by a client device 120 when the client device 120 is not in compliance.

Beginning at step 510, the gateway service 106 can deny the email request sent by the client device 120 in response to the client device 120 being out of compliance. In this instance, the gateway service 106 can refrain from forwarding the certificate retrieval request to the certificate server 107.

In step 520, the gateway service 106 can communicate with the certificate authority 109 and cause the email certificate 113 associated with the client device 120 to be revoked. While non-compliant activity by a client device 120 can cause the email certificate 113 of the client device 120 to be revoked, the email certificate 113 can be revoked for other reasons as well. For example, in some instances, a non-persistent email certificate scheme can be implemented whereby email certificates expire after a single use. The expired email certificates can be stored locally on the client devices 120 so that the email client 124 can still access prior email messages associated with the expired email certificates.

In step 530, the gateway service 106 can cause a notification to be sent to the client device 120 indicating denial of the email request. To cause the notification to be sent to the client device 120, the gateway service 106 can communicate with the management service 111. In response, the management service 111 can establish a communication channel with the messaging service 121 executing on the messaging server 128, and can instruct the messaging service 121 to transmit a particular message to a client device 120. The message transmitted to the client device 120 can instruct the client device 120 to check in with the management service 111. The notification can be stored in a command queue associated with the client device 120, and the client device 120 can retrieve the notification stored in its assigned command queue. Once the client device 120 returns to a state of compliance, the gateway service 106 can communicate with the certificate authority 109 to issue a new email certificate to the client device 120. Thereafter, the process shown in FIG. 5 ends.

With regards to the flowcharts in FIGS. 3-5, it should be emphasized that the functionality attributed to the various components can be implemented in a single process or application executed by the proxy server 105 in multiple processes or applications. Furthermore, it should be emphasized that the separation or segmentation of functionality as discussed herein is presented for illustrative purposes only as various functions can be combined or performed concurrently.

The flowcharts of FIGS. 3-5 and the sequence diagram of FIG. 2 show examples of the functionality and operation of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowchart and sequence diagram show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The various components described herein can include at least one processing circuit, where such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the components described herein can be stored in one or more storage devices and be executable by one or more processors. Also, a data store, such as the data store 110 in the enterprise server 102 and the data store in the client device 120 can be stored in the one or more storage devices.

The various components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

One or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more At least the following is claimed:

1. A method for retrieving email recipient information, comprising:
receiving an email request from a client device at a proxy server, the request intended for an email server and comprising a request for a certificate associated with the email recipient;
determining that the client device is compliant with a compliance rule;
rerouting a first portion of the email request to a certificate repository implemented in a server separate from a certificate repository maintained by the email server;
receiving the requested certificate from the certificate repository;
generating a response to the client device based on the received certificate and information received separately from the email server; and
sending the response to the client device.

2. The method of claim 1, further comprising removing the request for the certificate from the email request prior to rerouting, wherein rerouting the first portion of the email request comprises rerouting the request for the certificate.

3. The method of claim 1, wherein the email request comprises a request for recipient email information, and wherein the method further comprises sending the request for recipient email information to the email server.

4. The method of claim 3, wherein the information received separately from the email server comprises the recipient email information.

5. The method of claim 3, wherein the recipient email information is received from the email server in response to providing a second portion of the email request to the email server.

6. The method of claim 1, wherein rerouting the first portion of the email request is performed in response to determining that the client device is compliant with the compliance rule.

7. The method of claim 1, further comprising revoking an email certificate associated with the client device based on determining that the client device is not compliant with a compliance rule.

8. A non-transitory, computer-readable medium containing instructions executed by a hardware-based processor to perform stages for retrieving email recipient information, the stages comprising:
receiving an email request from a client device at a proxy server, the request intended for an email server and comprising a request for a certificate associated with the email recipient;
determining that the client device is compliant with a compliance rule;
rerouting a first portion of the email request to a certificate repository implemented in a server separate from a certificate repository maintained by the email server;
receiving the requested certificate from the certificate repository;
generating a response to the client device based on the received certificate and
information received separately from the email server; and
sending the response to the client device.

9. The non-transitory, computer-readable medium of claim 8, the stages further comprising removing the request for the certificate from the email request prior to rerouting, wherein rerouting the first portion of the email request comprises rerouting the request for the certificate.

10. The non-transitory, computer-readable medium of claim 8, wherein the email request comprises a request for recipient email information, and wherein the method further comprises sending the request for recipient email information to the email server.

11. The non-transitory, computer-readable medium of claim 10, wherein the information received separately from the email server comprises the recipient email information.

12. The non-transitory, computer-readable medium of claim 10, wherein the recipient email information is received from the email server in response to providing a second portion of the email request to the email server.

13. The non-transitory, computer-readable medium of claim 8, wherein rerouting the first portion of the email request is performed in response to determining that the client device is compliant with the compliance rule.

14. The non-transitory, computer-readable medium of claim 8, the stages further comprising revoking an email certificate associated with the client device based on determining that the client device is not compliant with a compliance rule.

15. A system for retrieving email recipient information, comprising:
a non-transitory, computer-readable medium that contains instructions;
a hardware-based processor that executes the instructions to perform stages including:
receiving an email request from a client device at a proxy server, the request intended for an email server and comprising a request for a certificate associated with the email recipient;
determining that the client device is compliant with a compliance rule;
rerouting a first portion of the email request to a certificate repository implemented in a server separate from a certificate repository maintained by the email server;
receiving the requested certificate from the certificate repository;
generating a response to the client device based on the received certificate and
information received separately from the email server; and
sending the response to the client device.

16. The system of claim 15, the stages further comprising removing the request for the certificate from the email request prior to rerouting, wherein rerouting the first portion of the email request comprises rerouting the request for the certificate.

17. The system of claim 15, wherein the email request comprises a request for recipient email information, and wherein the method further comprises sending the request for recipient email information to the email server.

18. The system of claim 17, wherein the information received separately from the email server comprises the recipient email information.

19. The system of claim 17, wherein the recipient email information is received from the email server in response to providing a second portion of the email request to the email server.

20. The system of claim 15, wherein rerouting the first portion of the email request is performed in response to determining that the client device is compliant with the compliance rule.

* * * * *